United States Patent  
Chandrasekaran et al.

(10) Patent No.: US 8,214,576 B2
(45) Date of Patent: Jul. 3, 2012

(54) ZERO COPY TRANSPORT FOR TARGET BASED STORAGE VIRTUAL APPLIANCES

(75) Inventors: Karthik Chandrasekaran, Bangalore (IN); Supratim Deka, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 288 days.

(21) Appl. No.: 12/397,117

(22) Filed: Mar. 3, 2009

(65) Prior Publication Data

US 2010/0228934 A1  Sep. 9, 2010

(51) Int. Cl.
*G06F 12/00* (2006.01)
(52) U.S. Cl. .............. 711/6; 711/179; 711/154; 711/202
(58) Field of Classification Search ........................ None
See application file for complete search history.

(56) References Cited

U.S. PATENT DOCUMENTS

| | | | | |
|---|---|---|---|---|
| 7,433,948 B2 * | 10/2008 | Edsall et al. | .................. | 709/224 |
| 8,073,674 B2 * | 12/2011 | Gehr et al. | ..................... | 703/24 |
| 2006/0168286 A1 * | 7/2006 | Makhervaks et al. | ......... | 709/231 |
| 2007/0061492 A1 * | 3/2007 | van Riel | ............................ | 710/3 |
| 2008/0091891 A1 | 4/2008 | Shiota et al. | | |
| 2009/0313446 A1 | 12/2009 | Schuba et al. | | |
| 2009/0328073 A1 * | 12/2009 | Tripathi | ........................ | 719/319 |
| 2010/0017802 A1 * | 1/2010 | Lojewski | .......................... | 718/1 |
| 2010/0161922 A1 | 6/2010 | Sharp et al. | | |

OTHER PUBLICATIONS

"Hypervisor" http://en.wikipedia.org/wiki/Hypervisor as archived by www.archive.org on Dec. 20, 2008.*

* cited by examiner

*Primary Examiner* — Sanjiv Shah
*Assistant Examiner* — Daniel Tsui

(57) ABSTRACT

A method of transferring data from a virtual machine (VM) to a storage virtual appliance (SVA) is disclosed. In this method, the data is transferred to an iSCSI (Internet Small Computer System Interface) device that is coupled to the VM and has a zero copy data mover implementation of a TCP socket interface. The method further includes sending a memory address of the data to the SVA. The SVA includes an iSCSI device having a zero copy data mover implementation of a TCP socket interface to receive the memory address of the data. The VM and the SVA are running in a same hypervisor host.

16 Claims, 3 Drawing Sheets

ZERO COPY TRANSPORT FOR TARGET BASED STORAGE VIRTUAL APPLIANCES

BACKGROUND

A Storage Virtual Appliance (SVA) is a special purpose virtual machine to manage shared storage in virtualized systems. A data transfer between a virtual machine and a SVA is performed through standard protocols as for example Network File System (NFS), Common Internet File System (CIFS), Internet Small Computer System Interface (iSCSI), etc.

There is a significant performance overhead, in terms of additional CPU cycles and latency, when compared to the traditional approach in which the storage virtualization service is provided directly by the hypervisor. Data copy to and from network buffers consumes a lot of CPU cycles when the hypervisor redirects the storage I/O (input-output) from a VM to a SVA using iSCSI or a similar TCP/IP based protocol. When writing data to storage, the VM sends the data to the hypervisor, which then copies it from the VM's memory onto the hypervisor network buffers and delivers the data over the virtual network to the SVA. The SVA network driver copies the data from the hypervisor buffers into the SVA's private buffers.

SUMMARY

In one embodiment, a method of transferring data from a virtual machine (VM) to a storage virtual appliance (SVA) is disclosed. In this method, the data is transferred to an iSCSI (Internet Small Computer System Interface) device that is coupled to the VM and has a zero copy data mover implementation of a TCP socket interface. The method further includes sending a memory address of the data to the SVA. The SVA includes an iSCSI device having a zero copy data mover implementation of a TCP socket interface to receive the memory address of the data. The VM and the SVA are running in a same hypervisor host.

In another embodiment, a system for transferring data from a virtual machine (VM) to a storage virtual appliance (SVA) is disclosed. The system includes an iSCSI (Internet Small Computer System Interface) device coupled to the VM having a zero copy data mover implementation of a TCP socket interface to send a memory address of a data to the SVA, and an iSCSI device coupled to the SVA having a zero copy data mover implementation of a TCP socket interface to receive the memory address from the VM and to read the data from the memory address.

In yet another embodiment, a computer readable media for storing programming instructions for transferring data from a virtual machine (VM) to a storage virtual appliance (SVA) is disclosed. The computer readable media includes programming instructions for transferring the data to an iSCSI (Internet Small Computer System Interface) device that is coupled to the VM and has a zero copy data mover implementation of a TCP socket interface and programming instructions for sending a memory address of the data to the SVA, wherein the SVA including an iSCSI device having a zero copy data mover implementation of a TCP socket interface to receive the memory address of the dat. The VM and the SVA are running in a same hypervisor host.

DETAILED DESCRIPTION

Figure 1:
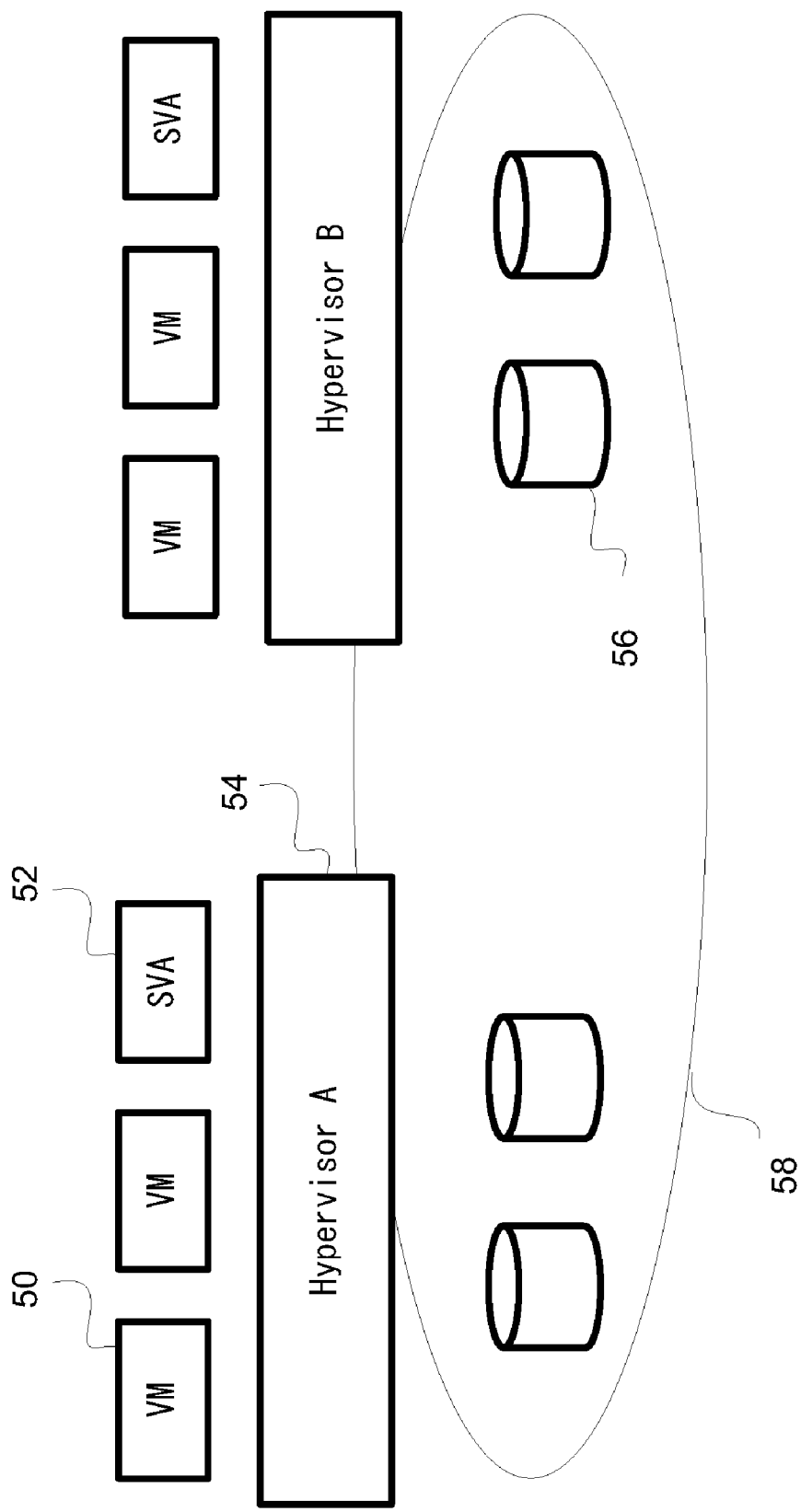
FIG. 1 illustrates a virtualized system including hypervisors, virtual machines and SVAs in accordance with one or more embodiments.

FIG. 1 illustrates a virtualized system, which includes one or more hypervisors 54 (e.g., VMware ESX™, Microsoft Hyper-V™, Citrix XenServer™, etc.). Each hypervisor 54 hosts one or more virtual machines (VM) 50 and at least one Storage Virtual Appliance (SVA) 52. Each hypervisor host includes Direct Attached Storage (DAS) 56. Direct Attached Storage refers to a digital storage system directly attached to a server or workstation, without a storage network in between.

A virtual appliance is a minimalist virtual machine image designed to run under a virtualization technology. Virtual appliances are a subset of the broader class of software appliances. A software appliance is a software application combined with a just enough operating system (JeOS) for it to run optimally on industry standard hardware (typically a server) or in a virtual machine. Like software appliances, virtual appliances are aimed to eliminate the installation, configuration and maintenance costs associated with running complex stacks of software. A key concept that differentiates a virtual appliance from a virtual machine is that a virtual appliance is a fully pre-installed and pre-configured application and operating system environment whereas a virtual machine is, by itself, without application software. A virtual appliance is usually built to host a single application.

Storage Virtual Appliances (SVAs) are special-purpose Virtual Machines (VMs) that enable shared-highly-available-storage functionality across hypervisor hosts. To provide a shared-highly-available-storage, SVAs enable transformation of DAS 56 into an iSCSI Storage Area Network (SAN) 58. SVAs across different hypervisor hosts work together in a clustered manner to provide shared and highly available storage without a need for commercially available SAN systems. Hence, the storage layer that is made up of DASs, in a virtualized system, is transformed into a shared storage layer. This shared storage layer can provide the data mirroring to enable fail proof operations of the virtual machines in the virtualized system. This shared storage layer also enables moving virtual machines from one hypervisor to another if a need arises due to, for example, hardware failure. A SVA, in one or more embodiment, allow access to this shared storage through block access protocols as for example iSCSI.

Figure 2:
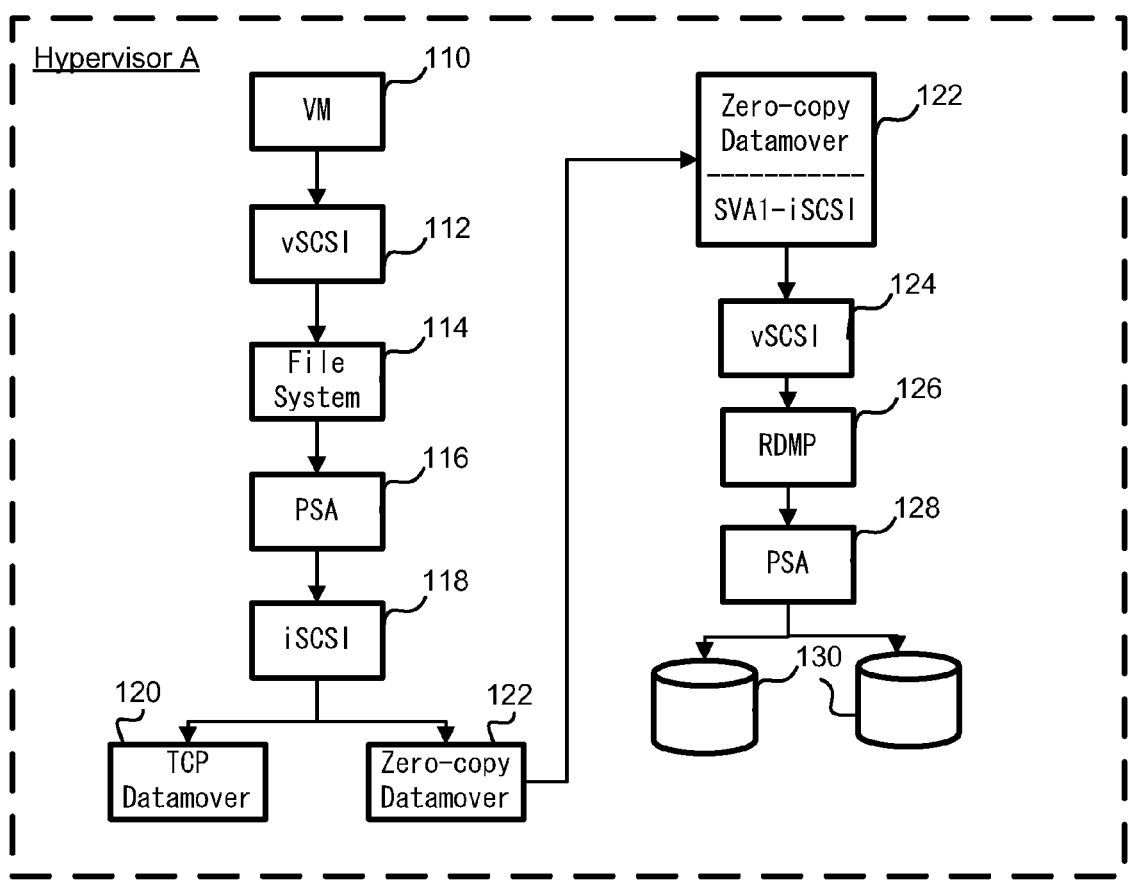
FIG. 2 illustrates a system for data transfer between a virtual machine and a SVA within a same hypervisor in accordance with one or more embodiments.

FIG. 2 illustrates a logical structure of a system for moving data from a VM 110 to a SVA in accordance with one embodiment. In this embodiment, both the VM 110 and the SVA are co-located in a same hypervisor host, Hypervisor A. VM 110 is coupled to a vSCSI device 112. vSCSI device 112 is a virtualized iSCSI device 118. The process of virtualizing devices and using these virtualized devices in virtual machines is a well known process; hence any further commentary on this process is being omitted.

When VM 110 needs to store data on its virtual device 112, Virtual device 112 hands over the data to the hypervisor volume management layer 114. In other words, a virtual device 112 exported to VM 110 is a storage object managed by the hypervisor volume manager/file system layer 114. To applications running in VM 110, this storage object appears to be a physical block device attached to the VM. However, in fact, the data is actually stored in physical storage which may not be isolated from VM 110 through one or more layers of abstraction. In the present embodiment, physical storage to store the VM 110 data is managed by the SVA. Hence, in this embodiment, the SVA acts as an iSCSI target.

File System 114 is coupled to iSCSI device 118 through a Plugable Storage Architecture (PSA) device 116. VM 110 File System 114 hands over the data to be stored in physical storage to iSCSI device 118. iSCSI device 118 includes a socket interface layer that provides an abstraction of transport layer services to the iSCSI protocol layer. In this embodiment, the socket layer includes a TCP Datamover 120 and a Zero-copy Datamover 122. When iSCSI device 118 receives the data from VM 110, iSCSI device 118 determines if the iSCSI target is co-located on the same hypervisor host. If the iSCSI target is co-located on the same hypervisor host as VM 110, Zero-copy Datamover 122 is selected for communicating the data to the iSCSI target, which is the SVA in this embodiment. If the iSCSI target is not co-located on the same hypervisor host as VM 110, TCP Datamover 120 is selected for communicating the data to the iSCSI target. TCP Datamover 120 uses standard iSCSI and TCP methods to transmit the data to the iSCSI target, hence a commentary of the operations of TCP Datamover 120 is being omitted.

If the SVA (i.e., the iSCSI target) is co-located on the same hypervisor host as VM 110, Zero-copy Datamover 122 sends the address of the data pages in which the data sent by VM 110 is stored in the hypervisor address space to the Zero-copy Datamover 122 module of the SVA iSCSI. The SVA then maps the data pages into SVA's own address space and finally stores the data in the physical storage 130 through a vSCSI 124, Raw Device Mapping 126 and a Pluggable Storage Architecture device 128.

In one or more embodiments, Zero-copy Datamover 122 is implemented to send the memory addresses of the data pages, rather than the data itself, to the iSCSI target. In one embodiment, a queue-pair protocol (such as Virtual Machine Communication Interface or VMCI protocol) or a ring buffer protocol is used to enable sending memory addresses to the SVA side Zero-copy Datamover from the VM side Zero-copy Datamover. At the iSCSI target side, a similar implementation of Zero-copy Datamover 122 intercepts the memory addresses of the data pages and makes a hypercall to the hypervisor to map the data pages into the SVA address space prior to storing the data in physical storage 130. The process of VMCI (Virtual Machine Communication Interface) socket programming is well known in the art.

Figure 3:
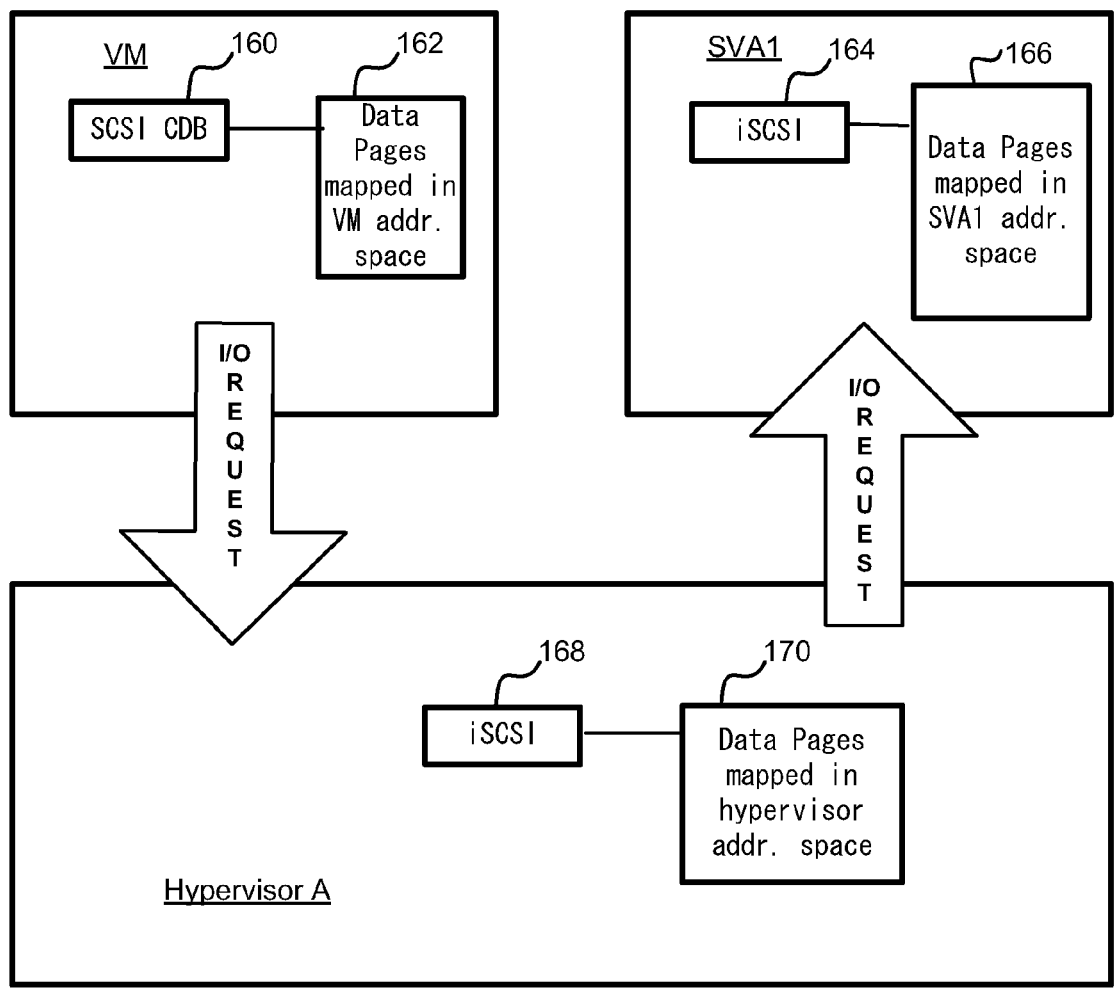
FIG. 3 illustrates a process of data transfer between a virtual machine and a SVA within a same hypervisor in accordance with one or more embodiments.

FIG. 3 further illustrates a method of moving data from a VM to a SVA, which is co-located in a same hypervisor host as the VM. After the data is delivered from the VM to the vSCSI device, an I/O request is made from the VM to the hypervisor. The I/O request includes a SCSI CDB (Command Descriptor Block) 160 that further includes the addresses of the data pages (containing data to be transferred) mapped in the VM address space 162. An iSCSI device 168 in the hypervisor receives the I/O request and then maps the data pages in the hypervisor addresses space 170. The hypervisor then makes an I/O request to the SVA. The SVA's iSCSI device 164 receives the I/O request and maps the data pages in the SVA's address space. The data is then stored in a physical storage by reading the data through the page mappings. Unless the SVA wants to retain the data in its own cache, the SVA does not need to make a copy of the data pages. The SVA can use the mapped data pages to send the I/O request to the physical storage to facilitate the end-to-end zero copy data from the VM to the physical storage through the SVA.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A method of transferring data, the method comprising:
receiving, at a device, the data for a target from a first virtual machine (VM), wherein the data is stored in a hypervisor address space;
determining if the target is co-located on a same hypervisor host as the first VM;
if the target is not co-located on the same hypervisor host as the first VM, transmitting the data to the target; and
if the target is co-located on the same hypervisor host, sending a memory address of the data stored in the hypervisor address space to the target without sending the data to the target, wherein:
the target is a storage virtual appliance (SVA), the SVA being a second virtual machine configured to manage storage of data for the first VM, and
the SVA, instead of the hypervisor, is configured to map the data to an address space of the SVA using the memory address and store the data stored in the hypervisor address space in physical storage managed by the SVA using the mapping of the data to the address space of the SVA.

2. The method as recited in claim 1, wherein if the target is co-located on the same hypervisor host, the SVA reads the data and copies the data into the physical storage.

3. The method as recited in claim 1, wherein the SVA makes an I/O request to the hypervisor, the I/O request including the memory address of the data stored in the hypervisor address space to map the data to the address space of the SVA.

4. The method as recited in claim 3, wherein the SVA is authorized by the hypervisor to make the hypercall prior to making the hypercall.

5. The method as recited in claim 1, wherein sending the memory address includes using a Virtual Machine Communication Interface (VMCI) protocol to send the memory address to the SVA.

6. The method as recited in claim 1, wherein if the target is co-located on the same hypervisor host, the SVA uses the mapping to the address space of the SVA to read the data stored in the hypervisor address space, wherein the SVA does not store the data in the address space of the SVA.

7. The method as recited in claim 1, wherein:
if the target is not co-located on the same hypervisor host, a data mover interface is used to transmit the data, and
if the target is co-located on the same hypervisor host, a zero copy mover interface is used to transmit the memory address and not the data.

8. A system for transferring data, the system including:
a first device configured to:
receive the data for a second device from a first virtual machine (VM), wherein the data is stored in a hypervisor address space;
determine if the second device is co-located on a same hypervisor host as the first VM;
if the second device is not co-located on the same hypervisor host as the first VM, transmit the data to the second device; and
if the second device is co-located on the same hypervisor host, send a memory address of the data stored in the hypervisor address space to the second device without sending the data to the second device, wherein:
the second device is a storage virtual appliance (SVA), the SVA being a second virtual machine configured to manage storage of data for the first VM, and
the SVA, instead of the hypervisor, is configured to map the data to an address space of the SVA using the memory address and store the data stored in the hypervisor address space in physical storage managed by the SVA using the mapping of the data to the address space of the SVA.

9. The system as recited in claim 8, wherein the first device coupled to a VM side and the second device coupled to a SVA side communicate through a VMCI protocol to transfer the memory address.

10. A non-transitory computer readable media for storing programming instructions for transferring data, the computer readable media comprising:
programming instructions for receiving, at a device, the data for a target from a first virtual machine (VM) and store the data in a hypervisor address space;
programming instructions for determining if the target is co-located on a same hypervisor host as the first VM;
programming instructions for transmitting the data to the target if the target is not co-located on the same hypervisor host as the first VM; and
programming instructions for sending a memory address of the data stored in the hypervisor address space to the target without sending the data to the target if the target is co-located on the same hypervisor host, wherein:
the target is a storage virtual appliance (SVA), the SVA being a second virtual machine configured to manage storage of data for the first VM, and
the SVA, instead of the hypervisor, is configured to map the data to an address space of the SVA using the memory address and store the data stored in the hypervisor address space in physical storage managed by the SVA using the mapping of the data to the address space of the SVA.

11. The non-transitory computer readable media as recited in claim 10, wherein the SVA makes an I/O request to the hypervisor, the I/O request including the memory address of the data stored in the hypervisor address space to map the data to the address space of the SVA.

12. The non-transitory computer readable media as recited in claim 10, wherein if the target is co-located on the same hypervisor host, the SVA reads the data and copies the data into the physical storage.

13. The non-transitory computer readable media as recited in claim 12, wherein the SVA is authorized by the hypervisor to make the hypercall prior to making the hypercall.

14. The non-transitory computer readable media as recited in claim 10, wherein if the target is co-located on the same hypervisor host, the SVA uses the mapping to the address space of the SVA to read the data stored in the hypervisor address space, wherein the SVA does not store the data in the address space of the SVA.

15. The non-transitory computer readable media as recited in claim 10, wherein:

if the target is not co-located on the same hypervisor host, a data mover interface is used to transmit the data, and if the target is co-located on the same hypervisor host, a zero copy mover interface is used to transmit the memory address and not the data.

16. The non-transitory computer readable media as recited in claim 10, wherein if the target is co-located on the same hypervisor host, the SVA uses the mapping to the address space of the SVA to read the data stored in the hypervisor address space, wherein the SVA does not store the data in the address space of the SVA.

* * * * *